US011423098B2

(12) United States Patent
Rama et al.

(10) Patent No.: US 11,423,098 B2
(45) Date of Patent: Aug. 23, 2022

(54) METHOD AND APPARATUS TO GENERATE A SIMPLIFIED QUERY WHEN SEARCHING FOR CATALOG ITEMS

(71) Applicant: SAP SE, Walldorf (DE)

(72) Inventors: Harish Kumar Sampangi Rama, Bangalore (IN); Anand Jain, Dimapur (IN)

(73) Assignee: SAP SE, Walldorf (DE)

(*) Notice: Subject to any disclaimer, the term of this patent is extended or adjusted under 35 U.S.C. 154(b) by 201 days.

(21) Appl. No.: 16/942,353

(22) Filed: Jul. 29, 2020

(65) Prior Publication Data
US 2022/0035873 A1  Feb. 3, 2022

(51) Int. Cl.
G06F 16/00    (2019.01)
G06F 16/951   (2019.01)
G06F 16/9538  (2019.01)
G06F 16/9536  (2019.01)

(52) U.S. Cl.
CPC ........ G06F 16/951 (2019.01); G06F 16/9536 (2019.01); G06F 16/9538 (2019.01)

(58) Field of Classification Search
CPC . G06F 16/951; G06F 16/9536; G06F 16/9538
See application file for complete search history.

(56) References Cited

U.S. PATENT DOCUMENTS

| | | | | |
|---|---|---|---|---|
| 6,978,273 B1* | 12/2005 | Bonneau | ................ | G06Q 30/02 707/999.102 |
| 8,065,202 B1* | 11/2011 | Ballaro | .............. | G06Q 30/0643 705/27.2 |
| 8,359,245 B1* | 1/2013 | Ballaro | ............. | G06Q 30/0603 705/27.1 |
| 9,542,439 B1* | 1/2017 | Cohen | ................. | G06F 16/2433 |
| 2001/0044758 A1* | 11/2001 | Talib | ...................... | G06Q 10/10 705/26.1 |
| 2002/0083062 A1* | 6/2002 | Neal | ..................... | G06F 16/951 |
| 2005/0251409 A1* | 11/2005 | Johnson | ................. | G06Q 30/02 705/343 |
| 2010/0094999 A1 | 4/2010 | Rama et al. | | |
| 2010/0262514 A1* | 10/2010 | Westphal | ........... | G06Q 30/0601 705/26.1 |
| 2011/0258083 A1* | 10/2011 | Ren | ..................... | G06Q 30/0633 705/26.1 |
| 2012/0296926 A1* | 11/2012 | Kalin | .................. | G06F 16/3322 707/765 |
| 2014/0081906 A1 | 3/2014 | Geddam et al. | | |

(Continued)

OTHER PUBLICATIONS

"Sourcing and Procurement (Materials Management)," SAP S/4HANA | 1909 FPD01, help.sap.com, Feb. 2020, 46 pages.

(Continued)

*Primary Examiner* — Jared M Bibbee
(74) *Attorney, Agent, or Firm* — Klarquist Sparkman, LLP

(57) ABSTRACT

Systems and methods are provided for generating a simplified catalog search query from a set of catalog access rules applicable to catalog user groups associated with a catalog user. For example, accessible sources are identified from the access rules. The accessible sources do not include sources that would lead to contradictory and/or useless search query phrases. Based on the accessible sources and the set of catalog access rules, a simplified search query is generated and run against a database of catalog items.

20 Claims, 9 Drawing Sheets

(56) References Cited

U.S. PATENT DOCUMENTS

2014/0222754 A1    8/2014  Geddam et al.
2015/0161364 A1*  6/2015  Makarov ................ G06F 21/30
                                                                     726/4
2015/0310526 A1* 10/2015  Warren ................ G06F 16/248
                                                                     705/26.62
2020/0118076 A1*  4/2020  Ballaro .............. G06Q 30/0635

OTHER PUBLICATIONS

"Query Optimization," *Wikipedia*, en.wikipedia.org, visited Jul. 14, 2020, 5 pages.

* cited by examiner

METHOD AND APPARATUS TO GENERATE A SIMPLIFIED QUERY WHEN SEARCHING FOR CATALOG ITEMS

FIELD

The field generally relates to search and improving search queries.

BACKGROUND

Catalog systems often publish many catalogs of items available to catalog users within an organization. However, not all published catalogs and items should be made available to all catalog users. To grant and/or restrict access to the published catalogs by the different catalog users, search queries can be applied based on catalog user groups and catalog visibility rules, for example. The search queries, however, often include contradictory and useless rules, leading to sub-optimal search queries and wasted processing power of the procurement systems.

There thus remains a need for generating simplified search queries when catalog users search for catalog items.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a computer-implemented method is provided. The computer-implemented method includes receiving a catalog search that includes a search criteria and a catalog user identifier for which the catalog search is to be performed, with the catalog user identifier associated with one or more catalog user group identifiers. Based on a plurality of access rules and the catalog search, a set of accessible source identifiers is identified. The plurality of access rules includes positive and negative rule conditions, and the positive and negative rule conditions represent a full access query when aggregated. Based on the positive rule conditions and the set of accessible source identifiers, the method builds a simplified access query with a list of query phrases for a subset of the positive rule conditions. The simplified access query is run against a plurality of catalog items returning a subset of the plurality of catalog items. Based on running the simplified access query, the method returns a catalog search result based on the subset of the plurality of catalog items.

In another embodiment, a computing system includes one or more processors and memory configured to cause the one or more processors to perform operations. The operations include identifying, based on a plurality of search group identifiers and a plurality of rules controlling access to a plurality of catalog items, a first set of source identifiers based on rules with positive conditions and a second set of source identifiers based on rules with negative conditions. If it is determined that the first set of source identifiers is an empty set and the second set of source identifiers is not an empty set, a list of query phrases is iteratively populated from the plurality of rules. If it is determined that the first and second sets of source identifiers are not empty sets, a third set of source identifiers is identified based on an intersection between the first and second sets of source identifiers, and in response to determining that the third set of source identifiers is an empty set, a fourth set of source identifiers is identified based on a difference between the first and second sets of source identifiers. The list of query phrases is iteratively populated from the rules with positive conditions and the fourth set of source identifiers. The operations further include generating an access query based on the populated list of access query phrases and running the access query on the plurality of catalog items.

In yet another embodiment, one or more non-transitory computer-readable media is provided with computer-executable instructions that, when executed, cause a computing system to perform a method. The method includes receiving, by a server from a first computing device, a plurality of access query rules for controlling access to a plurality of catalog items. The access query rules include positive and/or negative conditions based on one or more source identifier constraints, catalog identifier constraints, and/or catalog kit identifier constraints, and aggregation of the positive and negative conditions represents a full access query. The method also includes receiving a catalog search with one or more catalog user group identifiers by the server from a second computing device and determining a set of accessible source identifiers by the server based on the access query rules and the one or more catalog user group identifiers. The server then generates a simplified access query based on the rules with positive conditions and the set of accessible source identifiers. Generating the simplified access query includes: for rules based on source identifier constraints, populating access query phrases for the source identifier constraints present in the set of accessible source identifiers; for rules based on catalog kit identifier constraints, populating access query phrases for the catalog kit identifier constraints associated with source identifiers present in the set of accessible source identifiers; for rules based on a first set of catalog identifier constraints associated with source identifiers all present in the set of accessible source identifiers, populating access query phrases for the first set of catalog identifier constraints; and for rules based on a second set of catalog identifier constraints associated with source identifiers not all present in the set of accessible source identifiers, populating access query phrases for the second set of catalog identifier constraints with associated source identifiers present in the set of accessible source identifiers. The method further includes combining the populated access query phrases into the simplified access query to permit access to a subset of the plurality of items and the server running the simplified access query on the plurality of items.

The foregoing and other objects, features, and advantages of the invention will become more apparent from the following detailed description, which proceeds with reference to the accompanying figures.

DETAILED DESCRIPTION

Example 1

Overview

Granting and restricting access to catalogs and catalog items is an important feature within catalog systems. For example, catalog systems can allow hundreds of thousands of published catalogs, resulting in millions of catalog items being made available to thousands of catalog users accessing the catalog system. Organizations using the catalog systems may not want all of the catalog users to have access to all items or to all published catalogs.

To restrict or grant access to catalog items within a catalog system, administrators within an organization can provide rules dictating which catalog users and/or catalog user groups are permitted to view which catalogs and which catalog items. The organization can have thousands of catalog users within many overlapping catalog user groups, thus the rules can include thousands of rule conditions/constraints for granting or restricting access to the different catalog items. However, simply translating the all of the rule conditions/constraints into a full search query may not perform well. For example, a simple translation of each rule into the full search query can result in search query phrases that are contradictory, useless, or a mixture of both, resulting in a sub-optimal query.

By extracting knowledge about the catalogs and catalog items from the rules and catalogs, a simplified search query can be built from a set of query phrases that satisfy the all of the rules while also eliminating contradictory and useless search query phrases. The simplified search queries can be generated in real-time during searching, eliminating contradictory and useless search query phrases that result from changes to user group hierarchies and user group relationships by an organization after defining or amending the rules. Therefore, given a set of rules, a simplified search query can be built to satisfy all the rules while also running relatively fast and using less computational resources of the catalog system when compared to a full search query generated from translating all rules. In some embodiments, the catalog system can indicate that there is no need to not to run a search query if it is determined that the rules, and the resulting full and simplified search queries, will never return any catalog items for view by a catalog user. Building a simplified search query can also be performed relatively fast, efficiently utilizing the computational resources of the catalog system.

Example 2

Example System for Generating a Simplified Query

Figure 1:
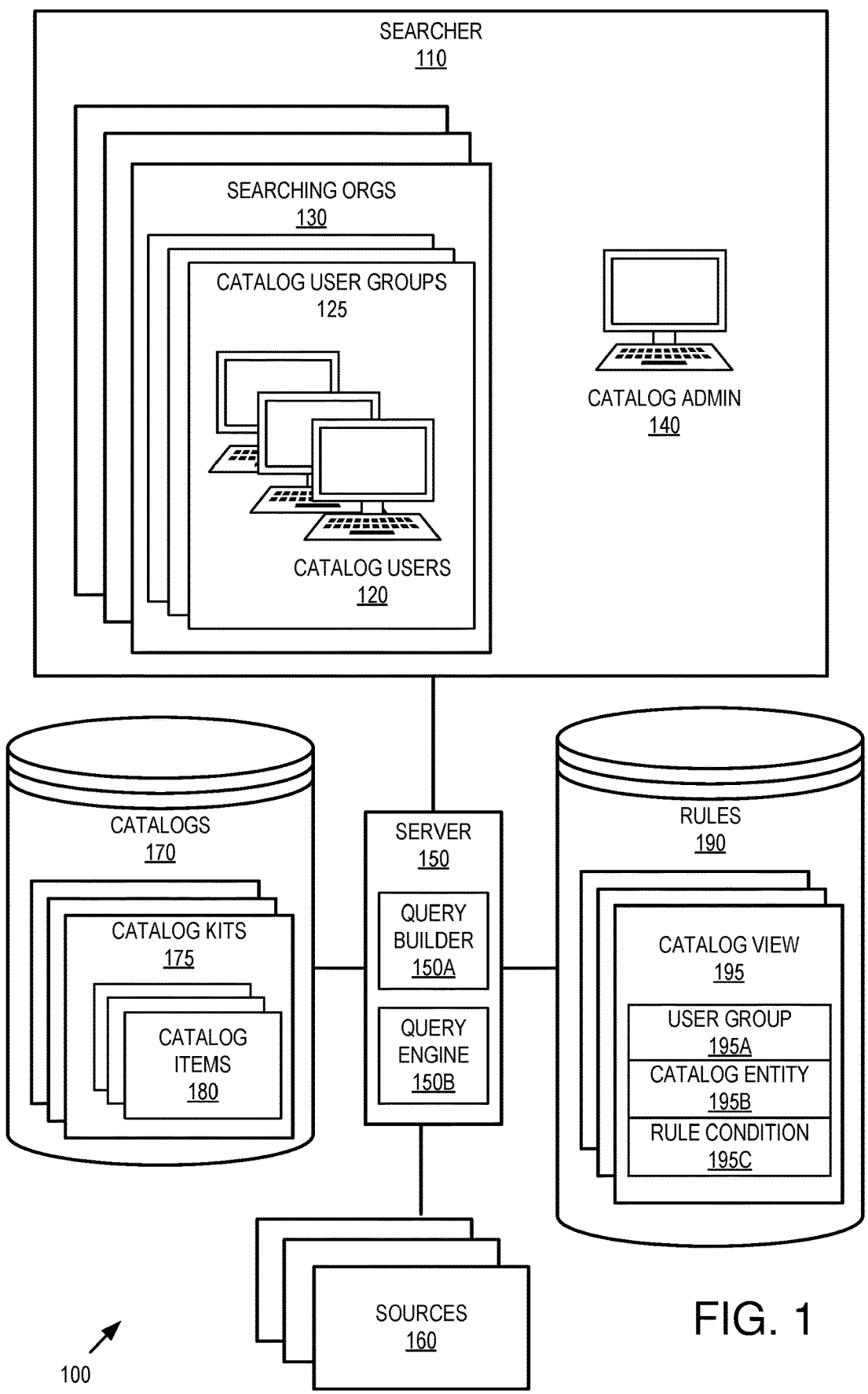
FIG. 1 is a block diagram of an example overall system for generating a simplified query when searching for catalog items.

FIG. 1 is a block diagram of an example system for generating a simplified query when searching for catalog items. In the example, the system 100 can include a searcher 110, a server 150, catalogs 170, rules 190, and sources 160. The server 150 can receive a catalog search from a catalog user 120 and can apply rules 190 provided to the server 150 by the catalog admin 140 via a simplified search query, as described herein.

The searcher 110 can be an organization utilizing a catalog system running on server 150. As shown, the searcher 110 can include multiple catalog users 120. In an example, each catalog user 120 can access the catalog system running on the server 150, such as via one or more workstations. The catalog users 120 can be associated with one or more catalog user groups 125 and/or searching organizations 130. The catalog user groups 125 can be hierarchical, with one or more parent user groups, peer user groups, and child user groups. Each catalog user 120 can be associated with multiple user groups 125 and/or searching organizations 130. The searcher 110 can also include a catalog admin 140 which can access the catalog system, such as via one or more workstations, and can provide one or more rules 190 and can register new catalog users 120, catalog user groups 125, and searching organizations 130. In some embodiments, one or more of the catalog users 120 can be a catalog admin 140.

The server 150 can run the catalog system and generate the simplified query based on the rules 190 and catalogs 170. For example, a query builder 150A can be configured generate the simplified query based on the rules 190. A query engine 150B can be configured to run the simplified query against the catalogs 170.

The server 150 can access to the catalogs 170. For example, the catalogs 170 can be stored in one or more databases coupled to or stored within the server 150. As shown, the catalogs 170 can include catalog kits 175 and catalog items 180. For example, a catalog kit 175 can associate multiple catalog items to be selected as a single group of catalog items 180. Each catalog 170, catalog kit 175, and catalog item 180 can be associated with a unique catalog identifier, catalog kit identifier, and catalog item identifier, respectively.

Each catalog 170, each catalog kit 175, and each catalog item 180 can be associated with a source 160, such as with a unique source identifier. The sources 160 can provide multiple catalogs 170 to the catalog system. For example, each source 160 can be a different organization providing catalog items for searching by the searcher 110 via the catalog system. In some embodiments, one or more catalogs 170 can include catalog items provided by different sources 160.

The server 150 can also access rules 190. For example, rules 190 can be stored in one or more databases coupled to or stored within the server 150. As shown, the rules 190 can be organized as catalog views 195. For example, each catalog view 195 can associate a user group 195A and a catalog entity 195B with a rule condition 195C, as described herein. The rules 190 can be provided by the catalog admin 140. In some embodiments, sources 160 can also provide one or more rules 190.

The described computing system components can be networked via wired or wireless network connections, including the Internet. Alternatively, or additionally, the system components can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). In any of the examples herein, the databases, rules, catalogs, catalog items, catalog kits, catalog user group identifiers, and the like can be stored in one or more computer-readable storage media or computer-readable storage devices. The technologies described herein can be generic to the specifics of operating systems or hardware and can be applied in any variety of environments to take advantage of the described features.

Example 3

Example Data Flow Generating a Simplified Query

Figure 2:
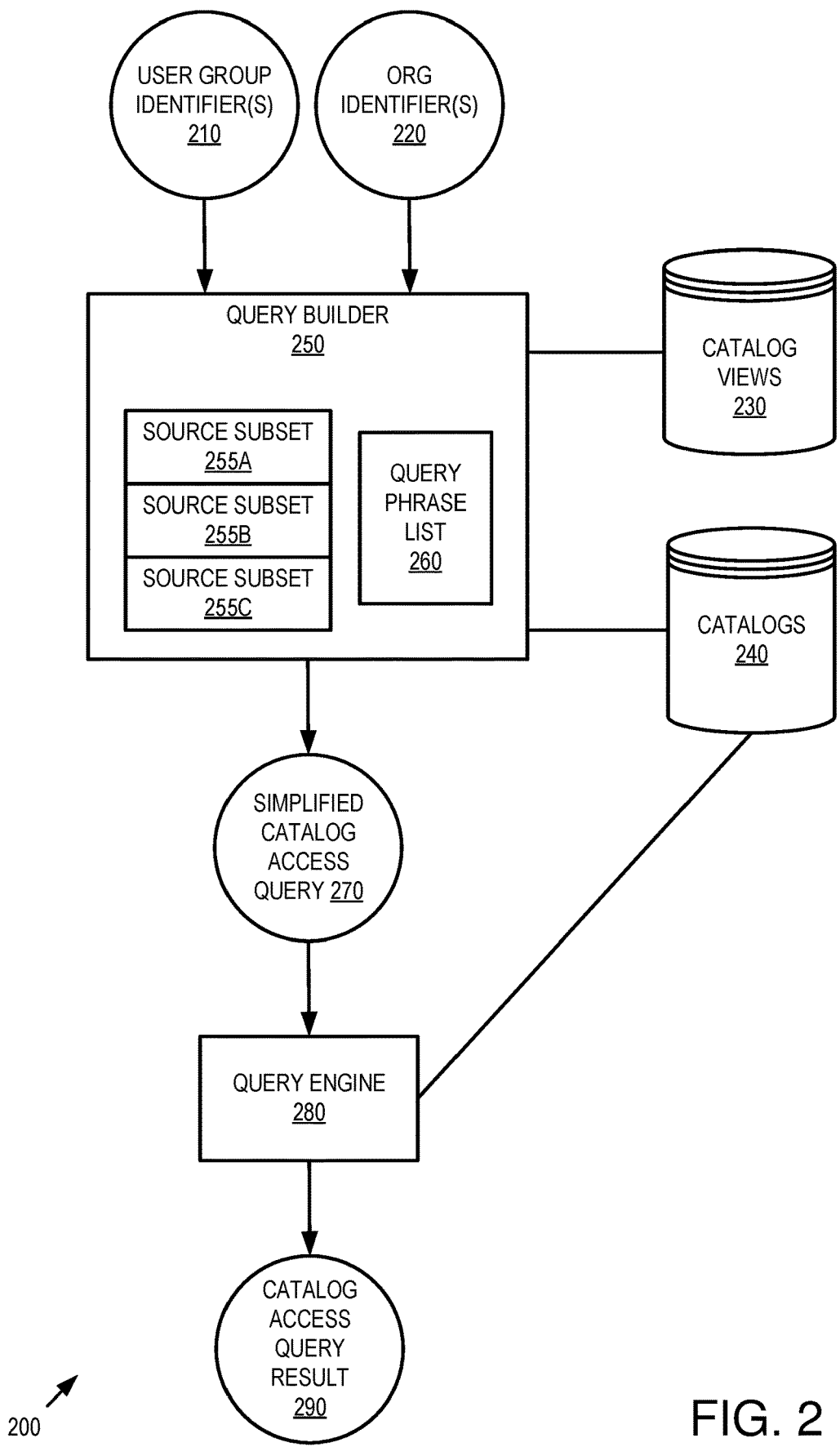
FIG. 2 is a block diagram of an example data flow for generating a simplified query when searching for catalog items.

FIG. 2 is a block diagram of an example data flow for generating a simplified query when searching for catalog items. In the example, a system 200 can include a database of catalog views 230, a database of catalogs 240, a query builder 250 and a query engine 280.

In the example shown, the query builder 250 receives one or more user group identifier(s) 210 and one or more organization identifiers 220. For example, the user group identifier(s) 210 and organization identifiers 220 are associated with a catalog user performing a catalog search. In some embodiments, the catalog user logs into the system 200, and based on the log-in, query builder 250 accesses the user group identifier(s) 210 and organization identifiers 220 associated with the catalog user, such as from a user group database (e.g., depicted in FIG. 4).

Using catalog views 230, which include rule conditions/ constraints that grant or restrict access to catalog items, and based on the received user group identifier(s) 210 and organization identifier(s) 220, the query builder 250 can identify a source subset 255A, a source subset 255B, and a source subset 255C for use in generating query phrase list 260. For example, source subset 255A includes sources for which access is granted and source subset 255B includes sources for which access is restricted. The source subset 255C can be identified by a difference operation performed on source subsets 255A, 255B, resulting in an accessible subset of sources. In some embodiments, the source subset 255C can instead include an inaccessible subset of sources. Sources can be identified from the catalog views 230 using the database of catalogs 240.

Using the catalog views 230 and the accessible subset of sources in source subset 255C, the query builder 250 can populate a query phrase list 260. By using the accessible subset of sources in source subset 255C, the populated query phrase list 260 includes query phrases satisfying the rule conditions for all catalog views 230 without contradictory or useless phrases present in a full access query. The query builder 250 then builds the simplified catalog access query 270 by combining the populated query phrase list 260, such as by combining the query phrases with AND or OR operators between phrases in the populated query phrase list 260.

In the example shown, the query engine 280 can run the simplified catalog access query 270 against the database of catalogs 240 to generate the catalog access query result 290. For example, catalog access query result 290 can include a subset of catalogs 240 and/or catalog items that are accessible to the catalog user.

Additional and different elements can be provided. For example, the system 200 can also include a search engine that can generate catalog search results for the catalog user based on catalog search criteria received from the catalog user and run against the subset of catalogs 240 and catalog items returned in the catalog access query result 290.

Example 4

Example Method of Generating a Simplified Query

Figure 3:
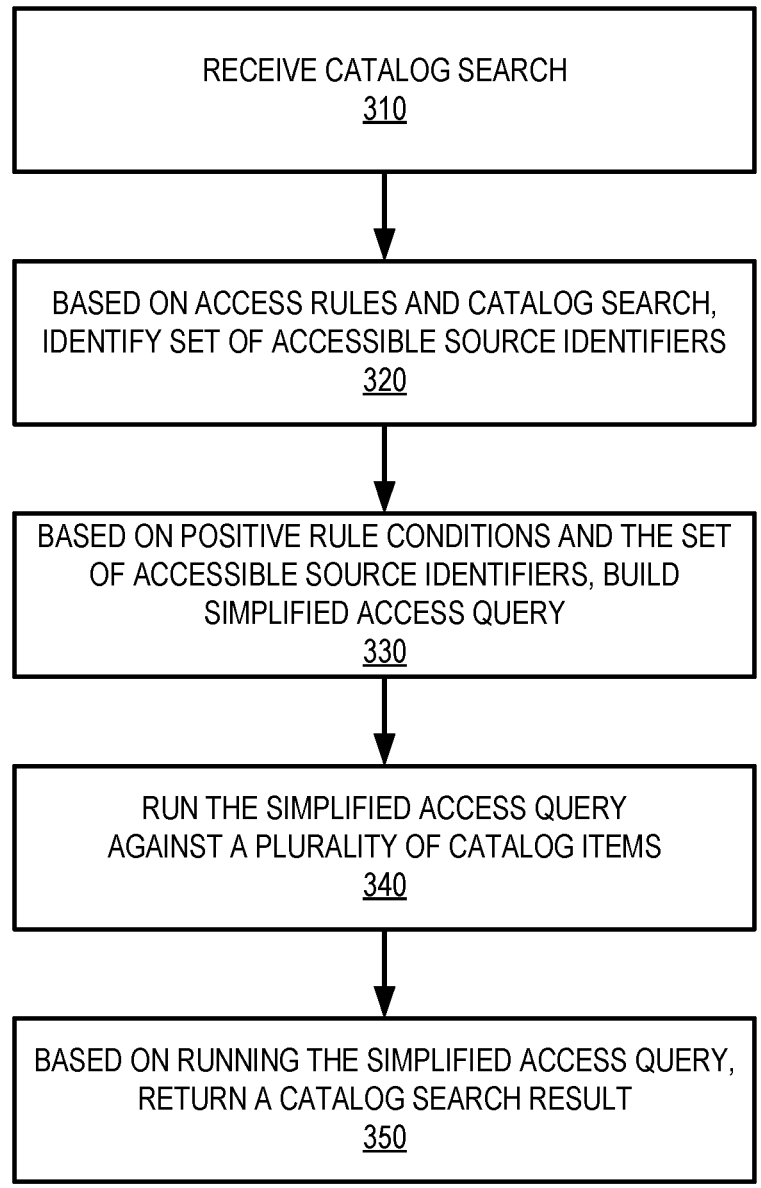
FIG. 3 is a flowchart of an example overall method of generating a simplified query when searching for catalog items.
Figure 3:

FIG. 3 is a flowchart of an example overall method of generating a simplified query when searching for catalog items, for example, by the system of FIG. 1 (e.g., the query builder). The automated nature of the method 300 allows for quickly building a simplified query.

At 310, a catalog search is received. For example, the catalog search can include search criteria and a catalog user identifier for which the catalog search is to be performed. The catalog user identifier can be associated with one or more catalog user group identifiers. In this embodiment, the catalog user group identifiers can be hierarchical group identifiers and/or searching organization identifiers.

At 320, a set of accessible source identifiers are identified. For example, the accessible source identifiers can be identified based on a plurality of access rules and the catalog search (e.g., the catalog user group identifiers associated with the catalog user). Alternatively, in some embodiments, a set of inaccessible source identifiers can be identified, such as when negative rule conditions are used to build the simplified search query.

In some embodiments, the access rules can include positive (e.g., granting access) and negative (e.g., restricting access) rule conditions. The access rules can relate the one or more catalog user group identifiers with source identifiers, catalog identifiers, and catalog kit identifiers, such as based on one of the positive or negative rule conditions. Aggregating all of the positive and negative rule conditions into a search query represents a full access query.

In some embodiments, the set of accessible source identifiers can be identified by the difference between source identifiers associated with the positive rule conditions and source identifiers associated with the negative rule conditions. For example, identifying the set of accessible source identifiers can include identifying a first set of source identifiers based on the positive rule conditions and a second set of source identifiers based on the negative rule conditions, then performing a difference operation between the first and second sets of source identifiers. Different operations can be performed, such as operations to remove any source identifiers present in the second set from the first set.

At 330, a simplified access query can be built based on a list of query phrases for a subset of the positive rule conditions. For example, the list of query phrases can be based on the positive rule conditions and the set of accessible source identifiers, such as by iteratively populating the list of the query phrases. In some embodiments, the simplified query can be built in response to determining that the first and second sets of source identifiers are not empty sets (i.e., both negative and positive rule conditions apply to a catalog user).

In some embodiments, iteratively populating the list of the query phrases can include populating a query phrase for a different rule in each iteration, then building the simplified access query by combining the populated query phrases separated by logical AND or OR operators.

For example, in iterations with rules having positive rule conditions based on source identifiers, query phrases can be populated for the respective source identifier if the source identifier is present in the set of accessible source identifiers.

For example, in iterations with rules having positive rule conditions based on catalog kit identifiers associated with source identifiers that are present in the set of accessible source identifiers, query phrases can be populated for respective source identifier or catalog kit associated the respective catalog kit identifier.

For example, in iterations with rules having positive rule conditions based on catalog identifiers associated with source identifiers that are all present in the set of accessible source identifiers, access query phrases are populated for the respective catalog identifier.

For example, in iterations with rules having positive rule conditions based on catalog identifiers associated with source identifiers that are not all present in the set of accessible source identifiers, access query phrases are populated for the respective catalog identifier combined with access query phrases for any associated source identifiers present in the set of accessible source identifiers.

In some embodiments, the list of query phrases can be further simplified. For example, if it is determined that the list of access query phrases references source identifiers making up more than half of all source identifiers associated with the plurality of catalog items, or substantially more than half, a list of negative query phrases can be populated for source identifiers not referenced in list of access query phrases. Then, the list of query phrases can be replaced the list of negative query phrases for use in building the in the simplified access query. In these embodiments, an inverse of the logical AND or OR operation will also be used.

At 340, the simplified access query is run against a plurality of catalog items. For example, running the simplified access query can return a subset of the plurality of catalog items that are accessible to a catalog user.

In some embodiments, search criteria can also be applied, further limiting the catalog items returned. The search criteria can include keywords, categories, filters, sources, or other criteria.

At 350, a catalog search result is returned in response to running the simplified access query, such as by returning a list including the subset of the plurality of catalog items or granting access to the subset of catalog items.

The illustrated actions can be described from alternative perspectives while still implementing the technologies.

Example 5

Example Rules

As discussed above, to restrict or grant access to catalog items within a catalog system, a searcher can define rules for accessing catalogs and catalog items. For example, within a searcher, a catalog admin can create groups of catalog users. For example, searching organizations can be created within the searcher, such as different searching organizations for different functions within the searcher. Further, catalog user groups can also be created within the searcher, such as different catalog user groups for "testers," "iPhone® phone users," "Android® users," "Windows® tablet users," and the like. Additional and different catalog user groups can be provided.

In the above example, the searcher can define rules for accessing catalogs and catalog items. The rules can include positive and negative rule conditions. For example, a positive rule condition can grant a searching organization or a catalog user group access to a catalog or one or more catalog items. Plain language of an exemplary rule with a positive condition can read: Users of group "testers" can only view catalog items from source "ABC Org". Plain language of a negative rule condition can restrict a searching organization or a catalog user group from accessing a catalog or catalog items. An exemplary rule with a negative rule condition can read: Users of group "iPhone® phone users" cannot view catalog items from source "XYZ Org". The rules can be defined in a syntax different plain language, such as in a syntax used for querying databases and/or defined for the catalog system.

The defined rules can be translated into search query phrases. For example, the catalogs, catalog items, and rules can be stored one or more database systems, such as an Oracle database or a Solr index. In an example, catalogs and rules can be stored in a traditional database, such as an Oracle database, and catalog items can be stored in a specialized search database, such as a Solr database. In this example, using catalog item data stored in Solr index, and catalog searches can be performed against the Solr index, returning one or more catalog items in response to the search. Different database systems can be used, such as other database systems storing catalog items in a tabular format. For the purposes of the examples herein, a pseudo SQL like syntax has been adopted.

Using a plain text translation, the above rules can be translated into query phrases and combined into a search query, resulting in the following full search query:

source=="ABC Org"&& source!="XYZ Org"

As will be described in more detail herein, using a plain text translation of thousands of rules to generate a full search query can result in contradictory and/or useless search query phrases, resulting in wasted computational resources when the query is performed.

Example 6

Example of Contradictory Rules

In an example, contradictory search query phrases can be generated. Assuming that a logged in catalog user who is part of user groups "testers" and "iPhone® phone users" issues a catalog search, and the following rules have been defined: Users of group "testers" can only view catalog items from source "ABC Org"; and Users of group "iPhone® phone users" cannot view catalog items from source "ABC Org". Using a plain text translation, the rules can be translated into query phrases and combined into a search query, resulting in the following full search query:

source=="ABC Org"&& source!="ABC Org"

Because the rules are applied concurrently, the resulting search query phrases contradict each other. In this case, when the full search query is run, no catalog items will be returned, thus computation resources are wasted executing the query on the backend server.

One or more sets of contradictory rules can be defined and included in a full search query. For example, it can be tedious for a catalog administrator to determine whether any rules are contradictory, especially when thousands of rules are defined for many overlapping catalog user groups. In some embodiments, the catalog system may not include functionality for detecting contradictory rules when the rules are defined.

In another example, user group hierarchies can be changed after rules are defined, rendering the rules contradictory after the rules are created. In this example, if a first catalog user group is reorganized from being a peer to being a child of a second catalog user group, a pair of rules for the first and second user groups can become contradictory after creation. Additional and different reasons for defining contradictory rules can result in sub-optimal search queries and wasted computational resources.

In a full search query, the above contradictory search query phrase can be included with other search query phrases, such as below:

source=="ABC Org"&& source!="ABC Org"&&
       source!="XYZ Org"

Again, because the rules are applied concurrently, the resulting search query phrases will include some phrases that contradict each other. When the full search query is run, no catalog items will be returned, thus computation resources are wasted executing the query on the backend server. Because contradictory search query phrases exist, a simplified search query may not be generated.

Example 7

Example Useless Rules

In another example, useless search query phrases can be generated. Assuming that a logged in catalog user who is part of user groups "AsiaPacfic" and "Global" issues a catalog search, and the following rules have been defined: Users of group "AsiaPacific" can only view catalog items from source "ABC Org"; and Users of group "Global" cannot view catalog items from source "XYZ Org". Using a plain text translation, the rules can be translated into query phrases and combined into a search query, resulting in the following full search query:

source=="ABC Org"& source!="XYZ Org"

Because the rules are applied concurrently, and assuming that the user group "AsiaPacific" group is a child of user group "Global", the second rule condition (i.e., source!="XYZ Org") is useless and will not be applied in the catalog search. Because the rule condition is useless, the rule condition need not be passed to the backend engine with a simplified search query, resulting in the following simplified search query:

source=="ABC Org"

One or more useless rules can be defined and included in a full search query. For example, it can be tedious for a catalog administrator to determine whether any rules are useless, especially when thousands of rules are defined for many overlapping user groups of catalog users. In some embodiments, the catalog system may not include functionality for detecting useless rules when the rules are defined.

In another example, user group hierarchies can be changed after rules are defined, rendering the rules useless after the rules are created. In this example, if a first catalog user group is reorganized from being a peer to being a child to a second catalog user group, one or more rules for the first and second user groups can become useless after creation. Additional and different reasons for defining useless rules may result in sub-optimal search queries and wasted computational resources.

Example 8

Example Sources

A catalog item can be associated with a source, also referred to herein as a supplier, such as by using a unique source identifier. A source can be an entity, such as a business entity or organization, that makes one or more catalog items available in a catalog system. As discussed above, rules for accessing catalogs and catalog items can have one or more rule conditions based on one or more sources, such as via source identifiers. For example, certain catalog users will be restricted from viewing catalog items from one or more sources and/or will be granted access to catalog items from one or more sources. In another example, certain catalog users will only be granted access to catalog items from a particular source.

Example 9

Example Buyers

Each catalog user is associated with a searcher, also referred to herein as a buyer, such as using a unique searcher or buyer identifier. Each buyer is an entity, such as a business entity or organization, that accesses catalog items in a catalog system. A catalog administrator associated with the buyer can define rules, or catalog views, to restrict or grant access to catalog items within a catalog system.

Example 10

Example Catalog Users

A catalog user can access a subset of catalog items in a catalog system. Catalog users can be associated with a unique user identifier within the catalog system. In any of the examples herein, a user identifier can take the form of an identifier that uniquely identifies a user within an organization, such as within a buyer entity.

Example 11

Example Catalog Items

A catalog item can be a product from a source that is made available in the catalog system. A catalog item can be identified by a unique item identifier, and can be associated with a single catalog, such as via a catalog identifier. Alternatively or additionally, a catalog item can be associated with multiple catalogs and/or one or more catalog kits, such as via catalog identifier(s) and catalog kit identifier(s). Each catalog item can also be associated with its source, such as via a source identifier.

Example 12

Example Catalogs

Each catalog can be a collection of catalog items. Catalogs can include catalog items from a single source, or catalog items from multiple sources. Each source can also publish multiple catalogs. Each catalog can be identified by a unique catalog identifier. As discussed above, rules for accessing catalogs and catalog items can have one or more rule conditions based on one or more catalogs, such as via the catalog identifiers. For example, certain catalog users will be restricted from viewing catalog items from one or more catalogs and/or will be granted access to catalog items from one or more catalogs. In another example, certain catalog users will only be granted access to catalog items from a particular catalog.

Example 13

Example Catalog Admins

Catalog administrators can be catalog users with privileges within the catalog system to create catalog views. For example, each catalog administrator can have privileged access the catalog system, such as to provide one or more rule conditions for the catalog views and to register new catalog users, catalog user groups, and searching organizations within the system. In some embodiments, the catalog administrator need not be a catalog user.

Example 14

Example User Groups

Catalog user groups are collections of catalog users within a buyer. Each catalog user can be associated with one or more catalog user groups, such as via unique catalog group identifiers. Catalog user groups can be organized in a hierarchy, such was with different levels of peer, child, and parent catalog user groups. Catalog user groups can also have other catalog user groups as members in addition to catalog users. Catalog user groups can be based on geographical locations, business functions, technology areas, organizational charts, device usages, software usages, and/or other delineations. Additional and/or different catalog user groups can be provided. Each catalog user can be part of multiple catalog user groups.

As discussed above, rules for accessing catalogs and catalog items can apply to a catalog user groups. For example, certain catalog user groups will be restricted from viewing catalog items and/or will be granted access to catalog items. In another example, certain catalog user groups will only be granted access to certain catalog(s).

Example 15

Example Search Organizations

Each catalog user can also be associated with one or more searching organizations, also referred to herein as search or purchase organizations. Search organizations can be associated with a unique search organization identifier within the catalog system. For example, search organizations can be groups of catalog users in a buyer entity, such as for bookkeeping or other purposes.

As discussed above, rules for accessing catalogs and catalog items can apply to a search organization. For example, certain search organizations will be restricted from viewing catalog items and/or will be granted access to catalog items. In another example, certain search organizations will only be granted access to certain catalog(s).

Example 16

Example Catalog Kits

Catalog kits are subsets of catalog items in a catalog that can be accessed and selected as a group. Catalog kits can include catalog items from a single source. Catalog kits can be associated with a unique catalog kit identifier within the catalog system. In some embodiments where catalogs include catalog items from multiple sources, catalog kits can include items from the multiple sources. Each catalog kit is presented as a single unit, and when selected, every catalog item in the catalog kit is selected concurrently.

As discussed above, rules for accessing catalogs and catalog items can have one or more rule conditions based on one or more catalog kits, such as via catalog kit identifiers. For example, certain catalog users will be restricted from viewing catalog items from one or more catalog kits and/or will be granted access to catalog items from one or more catalog kits. In another example, certain catalog users will only be granted access to catalog items from a particular catalog kit.

Example 17

Additional and/or Different Identifiers

Catalog items and catalog users can be associated with additional and/or different identifiers. For example, each catalog item can be associated with a commodity code related to the import and export of the catalog items from various countries, such as via a unique commodity code identifier. Like catalog user groups and search organizations, rule conditions can be defined for the commodity codes, such as to grant or restrict access to certain catalog items within certain geographical locations.

Example 18

Example Catalog Views

As discussed above, not all the catalog users should be able to view all catalog items from all the published catalogs provided by all sources. Rules are created by catalog administrators to grant or restrict the catalog items that are visible or accessible to the catalog users from buyer organization. These rules can be referred to as catalog views, and are defined associating a container and an entity with a visibility option.

Each container herein refers to a user group or a search organization, such as via a user group identifier or a search organization identifier. As discussed above, each catalog user can be associated with one or more user groups and search organizations. Each rule applies to one or more catalog users via the container.

Each entity refers to a source, a catalog, a catalog kit, or a commodity code, such as via a source identifier, a catalog identifier, a catalog kit identifier, or a commodity code identifier, respectively. As discussed above, each catalog item can be associated with one or more sources, catalogs, catalog kits and commodity codes. Each rule applies to one or more catalog items via the entity.

Each visibility option refers to a rule condition that is applied to catalog items for a catalog user. The visibility options can include positive and/or negative rule conditions. For example, positive rule conditions grant access to one or more catalog items. Exemplary positive rule conditions include "IfTrueCanSee" and "IfFalseCanSee". Conversely, negative rule conditions restrict access to one or more catalog items. Exemplary negative rule conditions include "IfTrueCannotSee" and "IfFalseCannotSee".

For example, "IfTrueCanSee" is a rule condition that grants a user access to catalog items if the catalog user is associated with the container (e.g., catalog user group, search organization, etc.) and the catalog items are associated with the entity (e.g., source, catalog, catalog kit, etc.).

For example, "IfFalseCanSee" is a rule condition that grants a user access to catalog items if the catalog user is not associated with the container (e.g., catalog user group, search organization, etc.) and the catalog items are associated with the entity (e.g., source, catalog, catalog kit, etc.).

For example, "IfTrueCannotSee" is a rule condition that restricts a user from access to catalog items if the catalog user is associated with the container (e.g., catalog user group, search organization, etc.) and the catalog items are associated with the entity (e.g., source, catalog, catalog kit, etc.).

For example, "IfFalseCannotSee" is a rule condition that restricts a user from access to catalog items if the catalog user is not associated with the container (e.g., catalog user group, search organization, etc.) and the catalog items are associated with the entity (e.g., source, catalog, catalog kit, etc.).

The catalog views can provide the rule conditions to grant and restrict access to catalog items based on the default visibility set by the catalog system. Default visibility options can blacklist or whitelist all catalog items in the system. For example, if the default visibility option whitelists all catalog items, each catalog user can access all catalog items in the system by default and can be restricted from accessing catalog items by one or more catalog views. In another example, if the default visibility option blacklists all catalog items, each catalog user cannot access any catalog items in the system by default and can be granted access to catalog items by one or more catalog views. In these examples, catalog views with positive rule conditions whitelist catalog items beyond the default visibility and catalog views with negative rule conditions blacklist catalog items beyond the default visibility. Catalog views work in conjunction with the default visibility to grant or restrict access to catalog items.

Example 19

Example Query Simplification

Search queries can be generated by translating the catalog views into query phrases to be applied against the catalog items. However, simply translating all the catalog views into a full search query may not perform well. As discussed above, a simple translation of each rule condition into the full search query can result in search query phrases that are contradictory, useless, or a mixture of both, resulting in a sub-optimal query.

A simplified search query can be generated eliminating contradictory and useless rules when generating search query phrases. For example, by extracting knowledge about relevant sources from the catalog views, a simplified search query can be generated without translating rule conditions applicable to sources associated with the contradictory or useless rule conditions.

For example, to generate a simplified search query, two empty sets can be created. An empty set A can created for source identifiers associated to positive rule conditions and an empty set B can be created for source identifiers associated with negative rule conditions. The empty sets A and B can store the source identifiers for use in subsequent actions.

Using the empty sets A and B, each catalog view is analyzed and one or more source identifiers is added to the empty sets A and B. Analyzing the catalog views can be an iterative process, taking a different catalog view in each iteration and repeating the process until all catalog views have been analyzed.

For example, if a visibility option reads "IfTrueCanSee", and the logged in catalog user is associated with the applicable catalog user group or search organization, one or more source identifiers is added to set A. Source identifiers to be added to set are determined by the entity associated with the applicable catalog view. For example, if the entity is a source, then the source identifier is added to set A. If the entity is a catalog, then all source identifiers associated with that catalog are added to set A. If the entity is a catalog kit, then the source identifier for one of the catalog items in the catalog kit is added to set A.

For example, if a visibility option reads "IfFalseCanSee", and the logged in catalog user is not associated with the applicable catalog user group or search organization, one or more source identifiers is added to set A. Source identifiers to be added to set are determined by the entity associated with the applicable catalog view. For example, if the entity is a source, then the source identifier is added to set A. If the entity is a catalog, then all source identifiers associated with that catalog are added to set A. If the entity is a catalog kit, then the source identifier for one of the catalog items in the catalog kit is added to set A.

For example, if a visibility option reads "IfTrueCannotSee", and the logged in catalog user is associated with the applicable catalog user group or search organization, one or more source identifiers is added to set B. Source identifiers to be added to set are determined by the entity associated with the applicable catalog view. For example, if the entity is a source, then the source identifier is added to set B. If the entity is a catalog, then all source identifiers associated with that catalog are added to set B. If the entity is a catalog kit, then the source identifier for one of the catalog items in the catalog kit is added to set B.

For example, if a visibility option reads "IfFalseCannotSee", and the logged in catalog user is not associated with the applicable catalog user group or search organization, one or more source identifiers is added to set B. Source identifiers to be added to set are determined by the entity associated with the applicable catalog view. For example, if the entity is a source, then the source identifier is added to set B. If the entity is a catalog, then all source identifiers associated with that catalog are added to set B. If the entity is a catalog kit, then the source identifier for one of the catalog items in the catalog kit is added to set B.

After analyzing the catalog views, the sets A and B can be used to determine if a simplified query should be built, and if so, to build the simplified query.

For example, if there is at least one catalog view (e.g., the number of catalog views>0) and sets A and B are empty sets (e.g., size(A)==0 and size(B)==0) after analyzing the catalog view(s), no views will be applied to the logged in catalog user. In this example, if a rule is to be applied on a first group, but the current user belongs to a second group (e.g., a peer or sibling of the first group), no rules will be applied to the second group. Therefore, if a full search query is run against the catalog items, no catalog items will be returned. In this example, no search query is required, or the search query can be empty, saving wasted computational resources on the backend of the catalog system. In this example, the system can allow the catalog user to view all catalog items without any restrictions (e.g., in a startup or small company or corporation), or the system can restrict all catalog items from the user and will not show any catalog items to user (e.g., in a large company or corporation).

In another example, if there is at least one catalog view (e.g., the number of catalog views>0), set A is an empty set (e.g., size(A)==0), and B is not an empty sets (e.g., size(B) >0) after analyzing the catalog view(s), all applicable rule conditions can be applied to the logged in catalog user and a simplified search query can be built. To build the simplified search query, an empty query phrase list Q can be created and each catalog view is analyzed to generate a list of search query phrases. The search query phrases can be generated iteratively, analyzing a different rule in each iteration to create a query phrase for each rule condition.

In this example, if the entity is a source, then a query phrase based on the associated source identifier (e.g., "sourceID!=<source-id>") is added to the query phrase list Q. If the entity is a catalog kit, then a query phrase based on the associated catalog kit identifier (e.g., "catalogKitID!=<catalog-kit-id>") is added to the query phrase list Q. If the entity is a catalog, then a query phrase based on the associated catalog identifier (e.g., "catalogID!=<catalog-id>") is added to the query phrase list Q. Then, to build the simplified search query, the query phrases in query phrase list Q are combined with "AND" operators into the simplified search query.

In yet another example, if there is at least one catalog view (e.g., the number of catalog views>0), set A is not an empty set (e.g., size(A)>0), and set B is or is not an empty set (e.g., size(B)>=0), the catalog view(s) are analyzed to determine if a subset of the applicable rule conditions can be applied to the logged in catalog user and a simplified search query can be built. To analyze the rule conditions, an empty set D can be created. An intersection operation can be performed to retain source identifiers present in both sets A and B (e.g., D=A•B). If set D is not an empty set (e.g., size (d)>0), then there are contradictory rule conditions. In response to identifying that contradictory rule conditions exist, the system can return empty results (i.e., no catalog items) and can optionally log an error and/or provide an error message to the user. If set D is an empty set (e.g., size (d)>0), then a simplified query can be built. To build the simplified search query, another empty set C can be created. A difference operation can then be performed to retain source identifiers present in both sets A and B (e.g., C=A−B). An empty query phrase list R can also be created, and each catalog view is analyzed to generate a list of search query phrases. The search query phrases can be generated iteratively, analyzing a different rule in each iteration to create a query phrase for each rule with a positive rule condition.

In this example, each iteration with a negative rule condition is skipped (e.g., if visibility=="IfTrueCannotSee" OR visibility=="IfFalseCannotSee" continue). For each positive rule condition (e.g., if visibility=="IfTrueCanSee" OR visibility=="IfFalseCanSee"), a search query phrase can be generated based on source identifiers in set C. If the entity is a source and the source identifier is in set C, then a query phrase based on the associated source identifier (e.g., "sourceID==<source-id>") is added to the query phrase list R. If the entity is a catalog kit and the source identifier associated with the catalog kit is in set C, then a query phrase based on the associated catalog kit identifier (e.g., "catalogKitID==<catalog-kit-id>") is added to the query phrase list R. If the entity is a catalog and all source identifiers associated with the catalog are in C, then a query phrase based on the associated catalog identifier (e.g., "catalogID==<catalog-id>") is added to the query phrase list R. However, if only a subset of source identifiers of a catalog are present in set C, then a query phrase based on the associated catalog identifier and the source identifiers in C (e.g., "catalogID==<catalog-id> AND sourceID in (sourceID1, sourceID2, . . . , sourceIDn))", where sourceID1, sourceID2, . . . , sourceIDn are the subset of sources of the catalog present in C) is added to the query phrase list R. Then, to build the simplified search query, the query phrases in query phrase list R are combined with "OR" operators into the simplified search query.

In the above examples, generating the search query phrases can be performed with two passes through the catalog views, thus the generation time can be generally proportional to the number of catalog views.

In the above example, the default visibility is whitelisting. In embodiments where default visibility is blacklisting, then the above example can be modified (e.g., resulting in an inversed query). For example, instead of the building search query phrases from positive rule conditions, negative rule conditions can be used. Further, when the empty set C is created, and the difference operation is performed, source identifiers present in both sets A and B can be subtracting sources from B (e.g., C=B−A). The simplified search query can then be built separating the list of populated access query phrases with AND operators.

Example 20

Example Further Query Simplification

In some embodiments, the simplified search query can be further simplified based on an inverse of the search query. For example, using the list of search query phrases (e.g., list Q or R discussed above), if it is determined that the list of phrases granting access to catalog items is larger than an inverse list restricting access to catalog items, the inverse list can further reduce computational resources used by the search query. In some embodiments, the catalog system performs further simplification when search query phrases are generated for more than half of all entities. In other embodiments, the catalog system only performs further simplification when search query phrases are generated for substantially more than half of all entities.

For example, if there are total of ten (10) sources and eight (8) sources are being searched explicitly by the search query phrases, a simplified search query can search more efficiently by restricting access to the two (2) missing sources rather than explicitly granting access to eight (8) sources. In this case, the simplified search query can include only two negative search query phrases (e.g., "sourceID!=<source-id9> OR sourceID!=<source-id10>"), rather than eight positive search query phrases (e.g., "sourceID==<source-id1>AND sourceID!=<source-id2>" AND . . . AND "sourceID==<source-id8>"). Similar simplification can be performed on query phrases based on catalog identifiers and catalog kit identifiers.

Example 21

Figure 4:
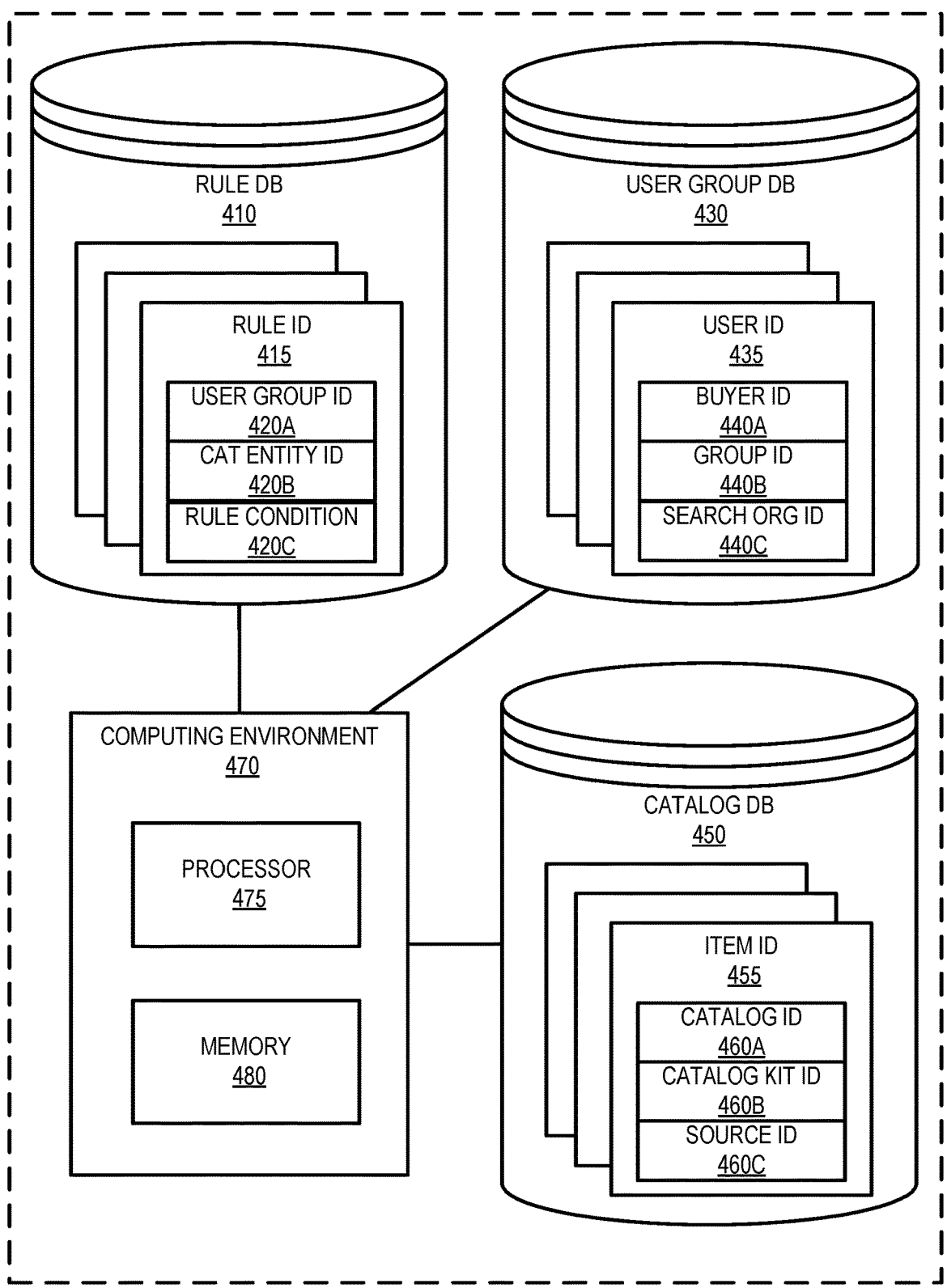
FIG. 4 is a block diagram of an example computing environment and database system for generating a simplified query when searching for catalog items.

Example Computing Environment and Database System for Generating a Simplified Query FIG. 4 is a block diagram of an example computing environment and database system for generating a simplified query when searching for catalog items. The computing environment 470 can include one or more processor 475 and one or more memory 480. The memory 480 can be configured to cause the one or more processor 475 to perform method acts, for example, method acts in the methods of FIGS. 2, 3, and 5-7.

The computing environment 470 can include or be coupled to one or more databases. For example, the computing environment 470 can be coupled to rule database 410, user group database 430, and catalog database 450. Additional or different databases can be provided. For example, the rule database 410, user group database 430, and catalog database 450 can be combined into a single database, or spread across additional databases.

The rule database 410, user group database 430, and catalog database 450 can store catalog information, catalog item information, and rule information, such as in one or more of an Oracle database and/or a Solr index. For example, using catalog item data stored in Solr index, and catalog searches can be performed against the Solr index. Different database systems can be used, such as database systems storing catalog items in a different tabular format.

In some embodiments, the rule database 410 includes database entries in a database table. For example, the database table can include database entries that include a rule identifier 415, a user group identifier 420A, catalog entity identifier 420B, a rule condition 420C, and a rule description. Additional and/or different rule information can be stored in the rule database 410.

In some embodiments, the user group database 430 includes database entries in a database table. For example, the database table can include database entries that include a user identifier 435, a buyer identifier 440A, a group identifier 440B, a search organization identifier 440C, and a user group description. Additional and/or different user group information can be stored in the user group database 430.

In some embodiments, the catalog database 450 includes database entries in a database table. For example, the database table can include database entries that include an item identifier 455, a catalog identifier 460A, a catalog kit identifier 460B, a source identifier 460C, and a catalog description. Additional and/or different catalog information can be stored in the catalog database 450.

Example 22

Method of Generating a Simplified Query

Figure 5:
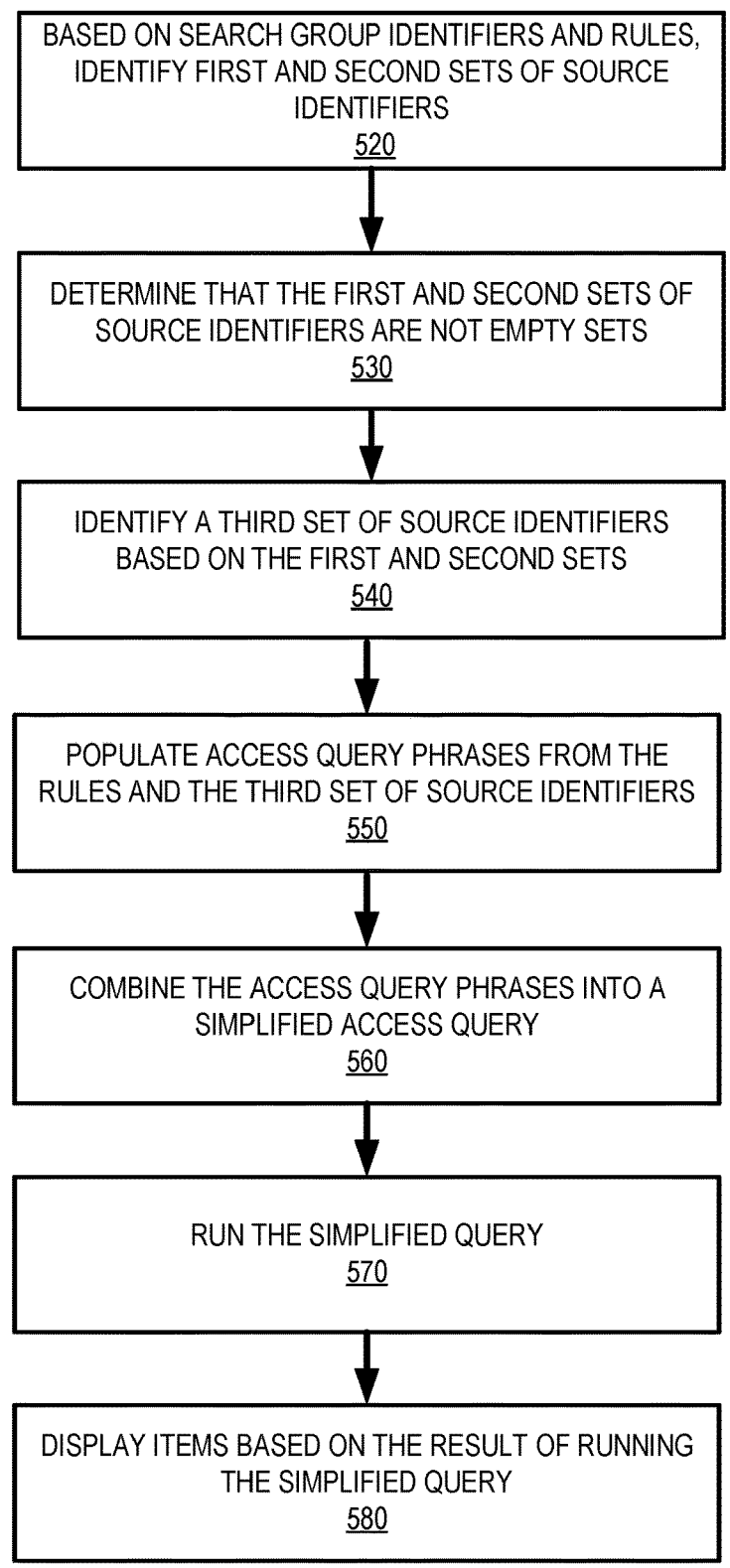
FIG. 5 is a flowchart of an example method of generating a simplified query when searching for catalog items.

FIG. 5 is a flowchart of an example method of generating a simplified query when searching for catalog items. The method 500 can be implemented, for example, by the systems of FIGS. 1 and 4.

At 520, a first set of source identifiers is identified based on rules with positive conditions and a second set of source identifiers is identified based on rules with negative conditions. The first and second sets of source identifiers are identified based on one or more search group identifiers and a set of rules controlling access to catalog items. For example, the set of rules can apply to source identifiers, catalog kit identifiers, and catalog identifiers associated with catalog items.

At 530, it is determined that the first and second sets of source identifiers are not empty sets. When the first and second sets of source identifiers are not empty sets, the method can proceed to generating a simplified access query to eliminate contradictory and useless rules from the rule set.

At 540, in response to determining that the first and second sets of source identifiers are not empty sets, a third set of source identifiers is identified based on a difference between the first and second sets of source identifiers. The third set of source identifiers includes only the source identifiers associated with positive rule conditions that do not conflict with the negative rule conditions.

At 550, using the third set of source identifiers, a list of query phrases is populated. For example, each rule with a positive rule condition can be taken iteratively, and if one or more source identifiers associated with that rule are present in the third set of source identifiers, a query phrase is populated for that rule.

For example, for each positive rule condition based on a source identifier, an access query phrase is populated for the source identifier if it is present in the third set of source identifiers. For each positive rule condition based on a catalog kit identifier, and access query phrase is populated for the catalog kit identifier associated if it is associated with a source identifier present in the third set of source identifiers.

For each positive rule condition based on a catalog identifier associated with source identifiers all present in the third set of source identifiers (e.g., the catalog identifiers collectively making up a first set of catalog identifiers), an access query phrase is populated for the catalog identifier. For each positive rule condition base on a catalog identifier associated with source identifiers not all present in the third set of source identifiers (e.g., the catalog identifiers collectively making up a second set of catalog identifiers), an access query phrase is populated for the catalog identifier along with the associated source identifiers present in the third set of source identifiers.

At 560, an access query is generated based on the populated list of access query phrases. For example, generating the access query can include separating the list of populated access query phrases with OR operators.

In some embodiments, additional search query simplification can be performed. For example, if it is determined that the populated list of access query phrases includes source identifier access query phrases for more than half of all source identifiers associated with the plurality of items, a second list of access query phrases can be populated for the source identifiers not present in the populated list of access query phrases. Then, the source identifier access query phrases in the populated list of access phrases can be replaced with the second list of populated access query phrases. An access query phrase can then be generated using the second list of populated access query phrases separated with AND operators.

At 570, the access query is run on the plurality of catalog items. For example, based on running the access query, a subset of the plurality of items is returned in a search result for display.

At 580, catalog items are displayed based on the search result of running the simplified query.

Additional and/or different acts can be performed. For example, alternatively, if it is determined that the first set of source identifiers is an empty set and the second set of source identifiers is not an empty set, a list of query phrases can be iteratively populated from the entire rule set. In yet another alternative, if it is determined that the first and second sets of source identifiers are empty sets, an empty list of access query phrases can be populated and/or a response can be generated indicating that no search query needs to be performed and/or indicating the empty list of access query phrases.

Example 23

Method of Generating a Simplified Query

Figure 6:
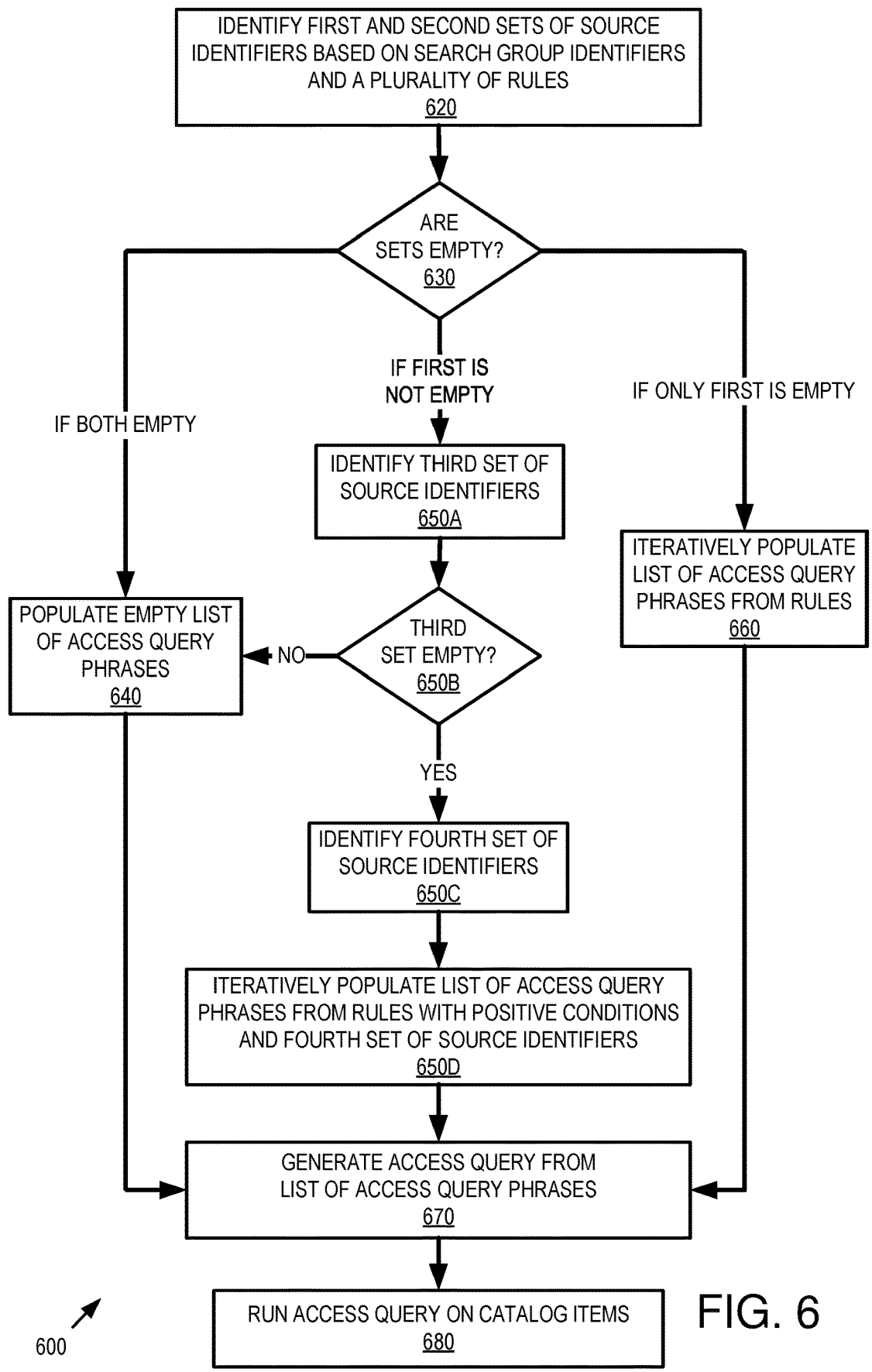
FIG. 6 is a flowchart of an example method of generating a simplified query when searching for catalog items.

FIG. 6 is a flowchart of another example method of generating a simplified query when searching for catalog items. The method 600 can be implemented, for example, by the systems of FIGS. 1 and 4.

At 620, a first and a second set of source identifiers can be identified. For example, the first and second sets of source identifiers can be identified based on search group identifiers and a plurality of rules.

At 630, a determination is made whether both sets are empty. Based on the determination, different access query phrases can be generated and/or an alert or notification can be generated.

At 640, responsive to determining that both sets are empty or responsive to determining that the third set is not empty (discussed below), an empty list of access query phrases can be generated. Alternatively or additionally, an alert or notification can be generated indicating that the access query will not result in any catalog items for access or display by the catalog user. In some embodiments, the alert or notification can indicate that no rules apply to the catalog user. The alert or notification can be provided to the catalog user and/or the catalog administrator.

At 650A, responsive to determining that the first set is not empty, a third set of source identifiers is identified. As discussed above, the third set of source identifiers can be generated by an intersection operation between the first and second sets of source identifiers. The third set of source identifiers includes source identifiers from contradictory rules.

At 650B, a determination is made whether the third set is empty. Based on the determination, different access query phrases can be generated and/or an alert or notification can be generated.

At 650C, responsive to determining that the third set is empty, a fourth set of source identifiers is identified. As discussed above, the fourth set of source identifiers can be generated by a difference operation between the first and second sets of source identifiers. The fourth set of source identifiers includes source identifiers to be used in populating the search query phrases and does not include source identifiers from contradictory rules.

At 650D, a list of access query phrases is iteratively populated from rules with positive conditions and the fourth set of source identifiers.

At 660, responsive to determining that only the first set is empty, a list of access query phrases iteratively populate from all rules applicable to the catalog user. In this case, all applicable rules include only negative rule conditions, without any rule conditions that contradict with any positive rule conditions.

At 670, an access query generated from the populated list of access query phrases. For example, the access query can include the populated list of access query phrases, with each phrase separated by an operator, such a logical AND or logical OR operator.

At 680, the access query is run on a plurality of catalog items. In response to running the access query, a subset of the plurality of catalog items is accessible by a catalog user computing system.

Example 24

Method of Generating a Simplified Query

Figure 7:
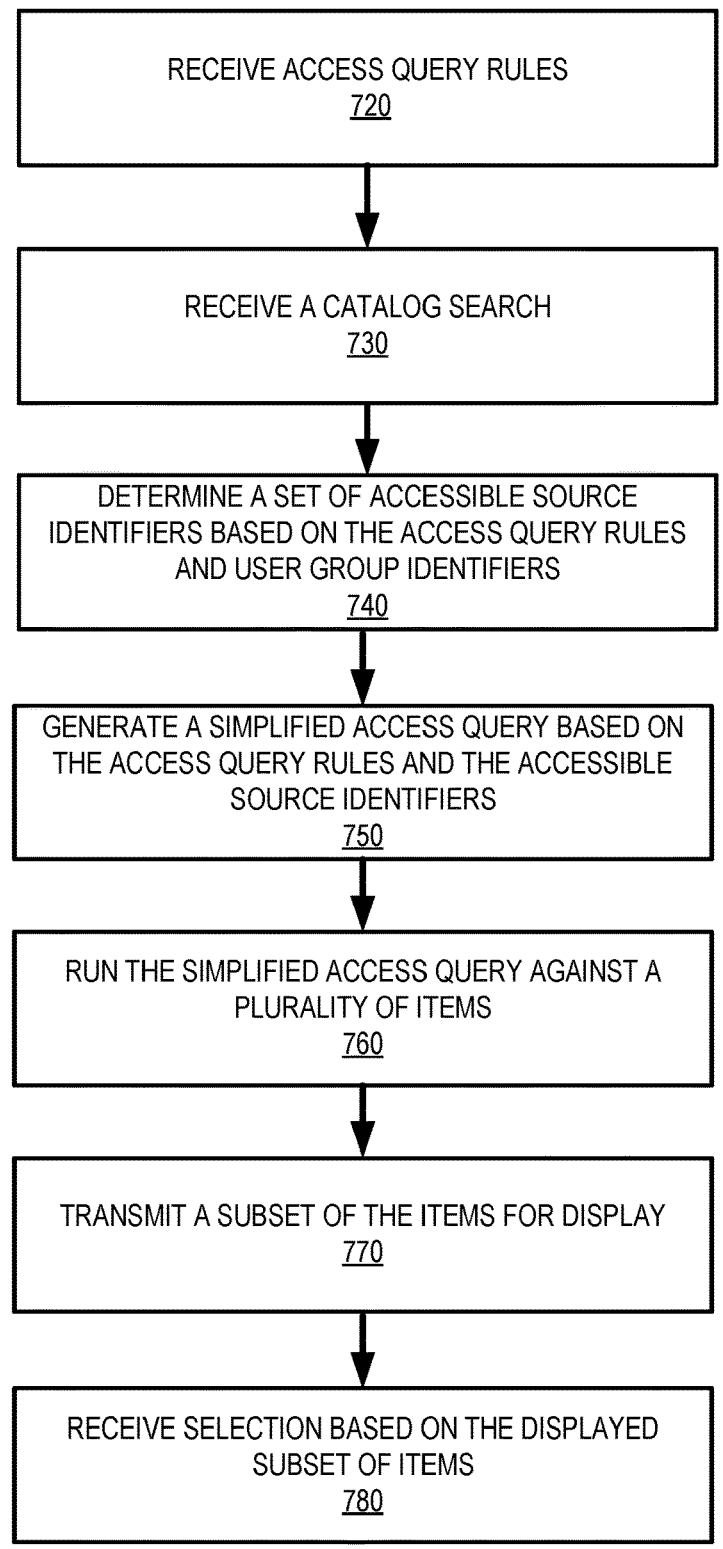
FIG. 7 is a flowchart of an example method of generating a simplified query when searching for catalog items.

FIG. 7 is a flowchart of yet another example method of generating a simplified query when searching for catalog items. The method 700 can be implemented, for example, by the systems of FIGS. 1 and 4.

At 720, a plurality of access query rules is received for controlling access to a plurality of catalog items. For example, the access query rules can be received by a server from a first computing device, such as a catalog administrator computing system. The access query rules can include both positive and negative rule conditions based on rule constraints. The rule constraints can include one or more source identifier constraints, one or more catalog identifier constraints, and/or one or more catalog kit identifier constraints. Aggregation of all of the positive and negative conditions represents a full access query, such as when the conditions are translated.

At 730, a catalog search can be received. The catalog search can include one or more catalog user group identifiers and/or search organization identifiers. Alternatively, the catalog search can include a catalog user identifier, which is associated with one or more catalog user groups and/or search organizations. The catalog search can be received by the server from a second computing device, such as a catalog user computing system.

At 740, a set of accessible source identifiers is determined. The set of accessible source identifiers can be determined by the server based on the access query rules. For example, accessible source identifiers can be determined from one or more catalog user group identifiers and search organization identifiers associated with the catalog user, and source identifiers associated with contradictory and useless rules are not included in the accessible source identifiers.

At 750, a simplified access query is generated. The simplified access query can be generated by the by the server based on the rules with positive conditions and the set of accessible source identifiers.

For example, for rules based on source identifier constraints, access query phrases are populated for the source identifier constraints present in the set of accessible source identifiers. For rules based on catalog kit identifier constraints, access query phrases are populated for the catalog kit identifier constraints associated with source identifiers present in the set of accessible source identifiers. For rules based on a first set of catalog identifier constraints, access query phrases are populated for each catalog associated with the first set of catalog identifier constraints. The first set of catalog identifier constraints includes catalogs with all associated with source identifiers present in the set of accessible source identifiers. For rules based on a second set of catalog identifier constraints, access query phrases are populated for the second set of catalog identifier constraints with associated source identifiers present in the set of accessible source identifiers. For example, the access query phrases for the second set of catalog identifier constraints includes a sub-phrase for the catalog identifier constraint separated by an AND operator with sub-phrases for each of the source identifiers present in the set of accessible source identifiers. The second set of catalog identifier constraints includes catalogs without all associated source identifiers present in the set of accessible source identifiers.

All of the populated access query phrases can then be combined into the simplified access query. The simplified access query grants or permits access to a subset of the plurality of items as a result of running the query.

At 760, the simplified access query is run against the plurality of items. The simplified access query can be run by the server based on catalog search received from the second computing device. Running the access query can return a subset of a plurality of the plurality of items.

At 770, the subset of the plurality of items is transmitted for display. The subset can be transmitted by the server to the second computing device, such as for display on the second computing device.

At 780, a selection is received based on the displayed subset of items. The selection can be received by the server, such as from the second computing device.

Example 25

Example Implementation

In any of the examples herein, the catalog items can be products that are available to users for purchase from a source (e.g., a product supplier or simply "supplier"). A source can publish multiple catalogs of products. A catalog with a catalog identifier and a product is associated with an item or product identifier. For example, the products can be made available for purchase within the catalog systems, such as a product procurement system (e.g., SAP Ariba Buyer). Catalog item sources can be product suppliers, such as product manufacturers or distributers, and each supplier is associated with a supplier identifier. A supplier can be a business entity or organization that can make products available for sale to the catalog users.

A catalog item can be directly added to a shopping cart by a catalog user for immediate purchase or added to a contract for a more involved purchase. Catalog kits act like a single unit and the unit can be added to a shopping cart for purchase. If a catalog kit is added to a shopping cart, then the products in the catalog kit will be added to the shopping cart.

A searcher can be a buyer organization that is an entity making purchases using the product procurement system. Buyers can purchase products from multiple suppliers which provide multiple catalogs that are made available in the system. The catalog users from the buyer organization can perform the actual purchase of products from the product procurement system. Searching or search organizations can be referred to as purchase organizations within the buyer and can be used for tracking expenses and other bookkeeping functions. Purchase organizations can include business departments, such as information technology (IT), marketing, manufacturing, and the like. Additional and different purchase organizations can be provided.

Example 26

Example Computing Systems

Figure 8:
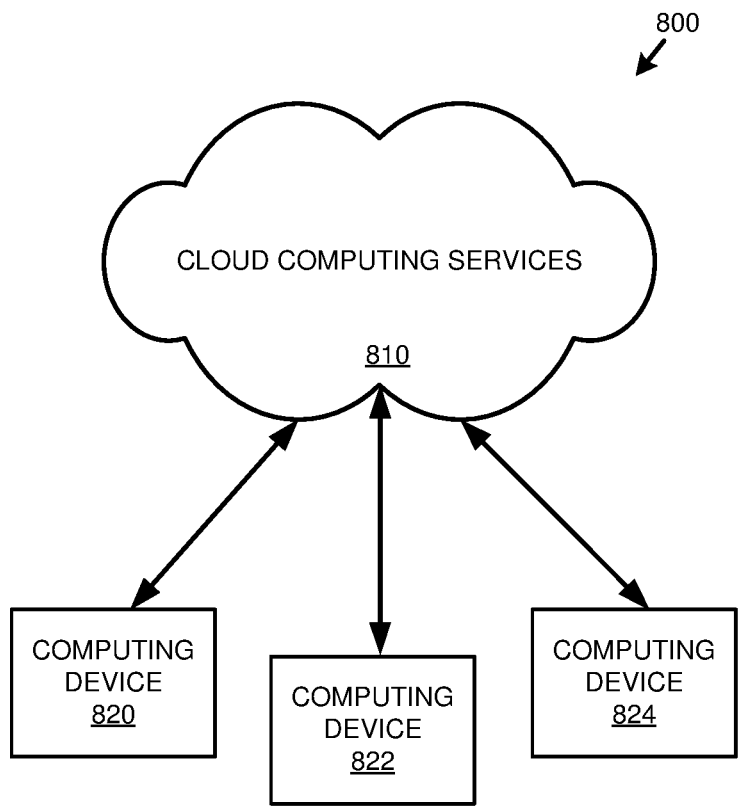
FIG. 8 is a block diagram of an example computing system in which described embodiments can be implemented.

FIG. 8 depicts an example of a suitable computing system 800 in which the described innovations can be implemented. The computing system 800 is not intended to suggest any limitation as to scope of use or functionality of the present disclosure, as the innovations can be implemented in diverse computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 can be volatile memory (e.g., registers, cache, RAM), non-volatile memory (e.g., ROM, EEPROM, flash memory, etc.), or some combination of the two, accessible by the processing unit(s) 810, 815. The memory 820, 825 stores software 880 implementing one or more innovations described herein, in the form of computer-executable instructions suitable for execution by the processing unit(s) 810, 815.

A computing system 800 can have additional features. For example, the computing system 800 includes storage 840, one or more input devices 850, one or more output devices 860, and one or more communication connections 870, including input devices, output devices, and communication connections for interacting with a user. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 can be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 can be an input device such as a keyboard, mouse, pen, or trackball, a voice input device, a scanning device, touch device (e.g., touchpad, display, or the like) or another device that provides input to the computing system 800. The output device(s) 860 can be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 27

Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 28

Example Cloud Computing Environment

Figure 9:
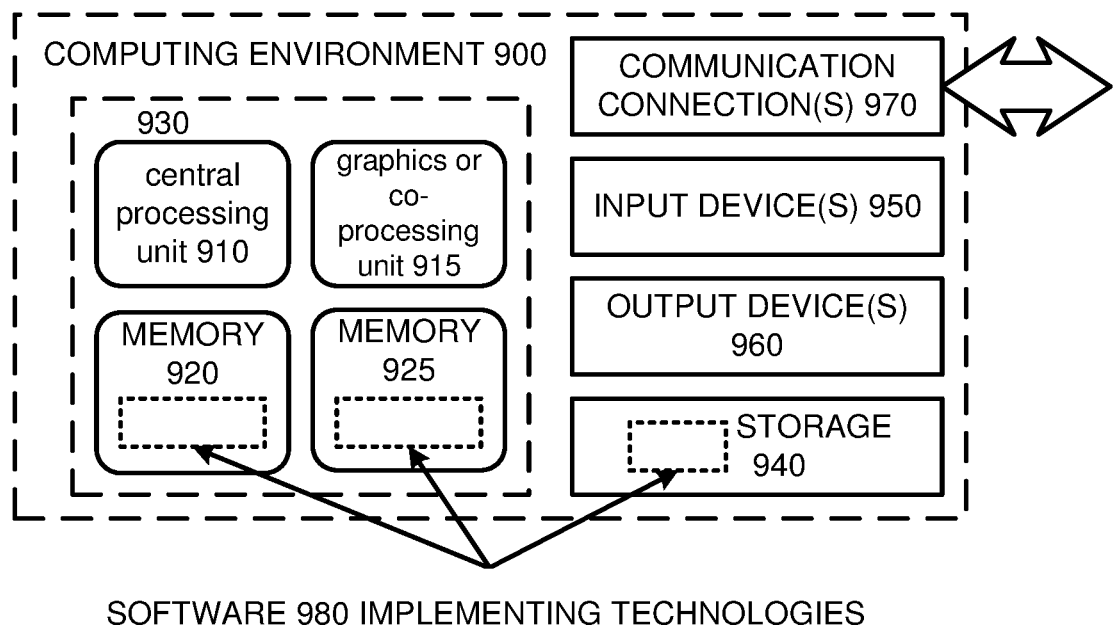
FIG. 9 is a block diagram of an example cloud computing environment that can be used in conjunction with the technologies described herein.

FIG. 9 depicts an example cloud computing environment 900 in which the described technologies can be implemented, including, e.g., the system 100 of FIG. 1 and other systems herein. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operations (e.g., data processing, data storage, and the like).

In practice, cloud-based, on-premises-based, or hybrid scenarios can be supported.

Example 29

Example Implementations

Although the operations of some of the disclosed methods are described in a particular, sequential order for convenient presentation, such manner of description encompasses rearrangement, unless a particular ordering is required by specific language set fourth herein. For example, operations described sequentially can in some cases be rearranged or performed concurrently.

Example 30

Example Embodiments

Any of the following embodiments can be implemented.
Clause 1. A computer-implemented method comprising:

receiving a catalog search comprising search criteria and a catalog user identifier for which the catalog search is to be performed, wherein the catalog user identifier is associated with one or more catalog user group identifiers;

identifying, based on a plurality of access rules and the catalog search, a set of accessible source identifiers, wherein the plurality of access rules comprises positive and negative rule conditions and wherein aggregation of the positive and negative rule conditions represents a full access query;

building, based on the positive rule conditions and the set of accessible source identifiers, a simplified access query, the simplified access query comprising a list of query phrases for a subset of the positive rule conditions;

running the simplified access query against a plurality of catalog items, wherein the running returns a subset of the plurality of catalog items; and returning, based on running the simplified access query, a catalog search result based on the subset of the plurality of catalog items.

Clause 2. The method of Clause 1, wherein:
the plurality of access rules relate the one or more catalog user group identifiers with source identifiers, catalog identifiers, and catalog kit identifiers based on one of the positive or negative rule conditions.

Clause 3. The method of any one of Clauses 1 or 2, wherein:
the one or more catalog user group identifiers comprise one or more group identifiers and search organization identifiers.

Clause 4. The method of any one of Clauses 1-3, wherein:
the set of accessible source identifiers comprises a difference between source identifiers associated with the positive rule conditions and source identifiers associated with the negative rule conditions.

Clause 5. The method of any one of Clauses 1-4, wherein identifying the set of accessible source identifiers comprises:
identifying, based on the positive rule conditions, a first set of source identifiers;
identifying, based on the negative rule conditions, a second set of source identifiers; and
performing a difference operation between the first and second sets of source identifiers.

Clause 6. The method of any one of Clauses 1-5, wherein:
building the simplified access query is performed in response to determining that the first and second sets of source identifiers are not empty sets.

Clause 7. The method of any one of Clauses 1-6, wherein:
building the simplified access query comprises combining the query phrases separated by logical OR operators.

Clause 8. The method of any one of Clauses 1-7, wherein:
building the simplified access query comprises iteratively populating a list of the query phrases.

Clause 9. The method of any one of Clauses 1-8, further comprising:
in response to determining that the list of access query phrases references source identifiers comprising more than half of all source identifiers associated with the plurality of catalog items, populating a list of negative query phrases for source identifiers not referenced in the simplified access query; and
replacing the list of access query phrases in the simplified access query with the list of negative query phrases.

Clause 10. The method of any one of Clauses 1-9, wherein:
building the simplified access query comprises:

for positive rule conditions based on source identifiers, populating query phrases for source identifiers present in the set of accessible source identifiers;

for positive rule conditions based on catalog kit identifiers associated with source identifiers present in the set of accessible source identifiers, populating query phrases for source identifiers associated the catalog kit identifiers;

for positive rule conditions based on catalog identifiers associated with source identifiers all present in the set of accessible source identifiers, populating access query phrases for the catalog identifiers; and for positive rule conditions based on catalog identifiers associated with source identifiers not all present in the set of accessible source identifiers, populating access query phrases for the catalog identifiers combined with access query phrases for the associated source identifiers present in the set of accessible source identifiers.

Clause 11. The method of any one of Clauses 1-10, wherein:

building the simplified access query comprises combining the populated query phrases separated by logical OR operators.

Clause 12. A computing system comprising:

one or more processors;

memory configured to cause the one or more processors to perform operations comprising:

identifying, based on a plurality of search group identifiers and a plurality of rules controlling access to a plurality of catalog items, a first set of source identifiers based on rules with positive conditions and a second set of source identifiers based on rules with negative conditions;

responsive to determining that the first set of source identifiers is an empty set and the second set of source identifiers is not an empty set:

iteratively populating a list of query phrases from the plurality of rules;

responsive to determining that the first and second sets of source identifiers are not empty sets:

identifying a third set of source identifiers based on an intersection between the first and second sets of source identifiers;

responsive to determining that the third set of source identifiers is an empty set, identifying a fourth set of source identifiers based on a difference between the first and second sets of source identifiers; and iteratively populating the list of query phrases from the rules with positive conditions and the fourth set of source identifiers;

generating an access query based on the populated list of access query phrases; and running the access query on the plurality of catalog items.

Clause 13. The computing system of Clause 12 wherein:

generating the access query comprises separating the list of populated query phrases with OR operators.

Clause 14. The computing system of any one of Clauses 12 or 13 wherein:

the plurality of rules comprise rules based on source identifiers, catalog kit identifiers, and catalog identifiers; and iteratively populating the list of query phrases for rules with positive conditions and the fourth set of source identifiers comprises:

for rules based on source identifiers, populating an access query phrase for a source identifier present in the fourth set of source identifiers;

for rules based on catalog kit identifiers, populating the access query phrase for a catalog kit identifier associated with the source identifier present in the fourth set of source identifiers;

for rules based on a first set of catalog identifiers associated with source identifiers all present in the fourth set of source identifiers, populating the access query phrase for a catalog identifier; and for rules based on a second set of catalog identifiers associated with source identifiers not all present in the fourth set of source identifiers, populating the access query phrase for the catalog identifier constraint with associated source identifiers present in the fourth set of source identifiers.

Clause 15. The computing system of any one of Clauses 12-14 wherein:

the operations further comprise generating, based on running the access query, a subset of the plurality of catalog items for display.

Clause 16. The computing system of any one of Clauses 12-15 wherein:

responsive to determining that the first and second sets of source identifiers are empty sets, the operations further comprise:

populating an empty list of access query phrases; and generating a response based on the empty list of access query phrases.

Clause 17. The computing system of any one of Clauses 12-16 wherein:

the operations further comprise:

responsive to determining that the populated list of query phrases includes source identifier access query phrases for more than half of all source identifiers associated with the plurality of catalog items:

populating a second list of access query phrases for source identifiers not present in the populated list of access query phrases; and replacing source identifier access query phrases in the populated list of query phrases with the second list of populated access query phrases.

Clause 18. One or more non-transitory computer-readable media comprising computer-executable instructions that, when executed, cause a computing system to perform a method comprising:

receiving, by a server from a first computing device, a plurality of access query rules for controlling access to a plurality of catalog items, the access query rules comprising positive and/or negative conditions based on one or more source identifier constraints, catalog identifier constraints, and/or catalog kit identifier constraints, wherein aggregation of the positive and negative conditions represents a full access query;

receiving, by the server from a second computing device, a catalog search comprising one or more catalog user group identifiers;

determining, by the server based on the access query rules and the one or more catalog user group identifiers, a set of accessible source identifiers;

generating, by the server based on the rules with positive conditions and the set of accessible source identifiers, a simplified access query, wherein the generating comprises:

for rules based on source identifier constraints, populating access query phrases for the source identifier constraints present in the set of accessible source identifiers;

for rules based on catalog kit identifier constraints, populating access query phrases for the catalog kit identifier constraints associated with source identifiers present in the set of accessible source identifiers;

for rules based on a first set of catalog identifier constraints associated with source identifiers all present in the set of accessible source identifiers, populating access query phrases for the first set of catalog identifier constraints; and for rules based on a second set of catalog identifier constraints associated with source identifiers not all present in the set of accessible source identifiers, populating access query phrases for the second set of catalog identifier constraints with associated source identifiers present in the set of accessible source identifiers; and combining the populated access query phrases into the simplified access query, wherein the simplified access query permits access to a subset of the plurality of items; and running, by the server, the simplified access query on the plurality of items.

Clause 19. The method of Clause 18, further comprising: transmitting, by the server to the second computing device, the subset of the plurality of items for display.

Clause 20. The method of any one of Clauses 18 or 19 wherein:

the first computing device comprises a catalog administrator computing system.

Example 31

Example Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A computer-implemented method comprising:

receiving a catalog search comprising search criteria and a catalog user identifier for which the catalog search is to be performed, wherein the catalog user identifier is associated with one or more catalog user group identifiers;

identifying, based on a plurality of access rules and the catalog search, a set of accessible source identifiers, wherein the plurality of access rules comprises positive and negative rule conditions and wherein aggregation of the positive and negative rule conditions represents a full access query;

building, based on the positive rule conditions and the set of accessible source identifiers, a simplified access query, the simplified access query comprising a list of query phrases for a subset of the positive rule conditions;

running the simplified access query against a plurality of catalog items, wherein the running returns a subset of the plurality of catalog items; and returning, based on running the simplified access query, a catalog search result based on the subset of the plurality of catalog items.

2. The method of claim 1, wherein:

the plurality of access rules relate the one or more catalog user group identifiers with source identifiers, catalog identifiers, and catalog kit identifiers based on one of the positive or negative rule conditions.

3. The method of claim 1, wherein:

the one or more catalog user group identifiers comprise one or more group identifiers and search organization identifiers.

4. The method of claim 1, wherein:

the set of accessible source identifiers comprises a difference between source identifiers associated with the positive rule conditions and source identifiers associated with the negative rule conditions.

5. The method of claim 1, wherein identifying the set of accessible source identifiers comprises:

identifying, based on the positive rule conditions, a first set of source identifiers;

identifying, based on the negative rule conditions, a second set of source identifiers; and performing a difference operation between the first and second sets of source identifiers.

6. The method of claim 5, wherein:

building the simplified access query is performed in response to determining that the first and second sets of source identifiers are not empty sets.

7. The method of claim 1, wherein:

building the simplified access query comprises combining the query phrases separated by logical OR operators.

8. The method of claim 1, wherein:

building the simplified access query comprises iteratively populating a list of the query phrases.

9. The method of claim 1, further comprising:

in response to determining that the list of access query phrases references source identifiers comprising more than half of all source identifiers associated with the plurality of catalog items, populating a list of negative query phrases for source identifiers not referenced in the simplified access query; and replacing the list of access query phrases in the simplified access query with the list of negative query phrases.

10. The method of claim 1, wherein:

building the simplified access query comprises:

for positive rule conditions based on source identifiers, populating query phrases for source identifiers present in the set of accessible source identifiers;

for positive rule conditions based on catalog kit identifiers associated with source identifiers present in the set of accessible source identifiers, populating query phrases for source identifiers associated the catalog kit identifiers;

for positive rule conditions based on catalog identifiers associated with source identifiers all present in the set of accessible source identifiers, populating access query phrases for the catalog identifiers; and for positive rule conditions based on catalog identifiers associated with source identifiers not all present in the set of accessible source identifiers, populating access query phrases for the catalog identifiers combined with access query phrases for the associated source identifiers present in the set of accessible source identifiers.

11. The method of claim 10, wherein:

building the simplified access query comprises combining the populated query phrases separated by logical OR operators.

12. A computing system comprising:

one or more processors;

memory configured to cause the one or more processors to perform operations comprising:

identifying, based on a plurality of search group identifiers and a plurality of rules controlling access to a plurality of catalog items, a first set of source identifiers based on rules with positive conditions and a second set of source identifiers based on rules with negative conditions;

responsive to determining that the first set of source identifiers is an empty set and the second set of source identifiers is not an empty set:
iteratively populating a list of query phrases from the plurality of rules;

responsive to determining that the first and second sets of source identifiers are not empty sets:
identifying a third set of source identifiers based on an intersection between the first and second sets of source identifiers;
responsive to determining that the third set of source identifiers is an empty set, identifying a fourth set of source identifiers based on a difference between the first and second sets of source identifiers; and
iteratively populating the list of query phrases from the rules with positive conditions and the fourth set of source identifiers;
generating an access query based on the populated list of access query phrases; and
running the access query on the plurality of catalog items.

13. The computing system of claim 12 wherein:
generating the access query comprises separating the list of populated query phrases with OR operators.

14. The computing system of claim 12 wherein:
the plurality of rules comprise rules based on source identifiers, catalog kit identifiers, and catalog identifiers; and
iteratively populating the list of query phrases for rules with positive conditions and the fourth set of source identifiers comprises:
for rules based on source identifiers, populating an access query phrase for a source identifier present in the fourth set of source identifiers;
for rules based on catalog kit identifiers, populating the access query phrase for a catalog kit identifier associated with the source identifier present in the fourth set of source identifiers;
for rules based on a first set of catalog identifiers associated with source identifiers all present in the fourth set of source identifiers, populating the access query phrase for a catalog identifier; and
for rules based on a second set of catalog identifiers associated with source identifiers not all present in the fourth set of source identifiers, populating the access query phrase for the catalog identifier constraint with associated source identifiers present in the fourth set of source identifiers.

15. The computing system of claim 12 wherein:
the operations further comprise generating, based on running the access query, a subset of the plurality of catalog items for display.

16. The computing system of claim 12 wherein:
responsive to determining that the first and second sets of source identifiers are empty sets, the operations further comprise:
populating an empty list of access query phrases; and
generating a response based on the empty list of access query phrases.

17. The computing system of claim 12 wherein:
the operations further comprise:
responsive to determining that the populated list of query phrases includes source identifier access query phrases for more than half of all source identifiers associated with the plurality of catalog items:
populating a second list of access query phrases for source identifiers not present in the populated list of access query phrases; and
replacing source identifier access query phrases in the populated list of query phrases with the second list of populated access query phrases.

18. One or more non-transitory computer-readable media comprising computer-executable instructions that, when executed, cause a computing system to perform a method comprising:
receiving, by a server from a first computing device, a plurality of access query rules for controlling access to a plurality of catalog items, the access query rules comprising positive and/or negative conditions based on one or more source identifier constraints, catalog identifier constraints, and/or catalog kit identifier constraints, wherein aggregation of the positive and negative conditions represents a full access query;
receiving, by the server from a second computing device, a catalog search comprising one or more catalog user group identifiers;
determining, by the server based on the access query rules and the one or more catalog user group identifiers, a set of accessible source identifiers;
generating, by the server based on the rules with positive conditions and the set of accessible source identifiers, a simplified access query, wherein the generating comprises:
for rules based on source identifier constraints, populating access query phrases for the source identifier constraints present in the set of accessible source identifiers;
for rules based on catalog kit identifier constraints, populating access query phrases for the catalog kit identifier constraints associated with source identifiers present in the set of accessible source identifiers;
for rules based on a first set of catalog identifier constraints associated with source identifiers all present in the set of accessible source identifiers, populating access query phrases for the first set of catalog identifier constraints; and
for rules based on a second set of catalog identifier constraints associated with source identifiers not all present in the set of accessible source identifiers, populating access query phrases for the second set of catalog identifier constraints with associated source identifiers present in the set of accessible source identifiers; and
combining the populated access query phrases into the simplified access query, wherein the simplified access query permits access to a subset of the plurality of items; and
running, by the server, the simplified access query on the plurality of items.

19. The method of claim 18, further comprising:
transmitting, by the server to the second computing device, the subset of the plurality of items for display.

20. The method of claim 18 wherein:
the first computing device comprises a catalog administrator computing system.

* * * * *